C. G. SMITH.
MACHINE FOR SPLITTING OR OTHER WORKING OF STONES AND THE LIKE.
APPLICATION FILED SEPT. 21, 1909.
999,896.
Patented Aug. 8, 1911.
3 SHEETS—SHEET 2.
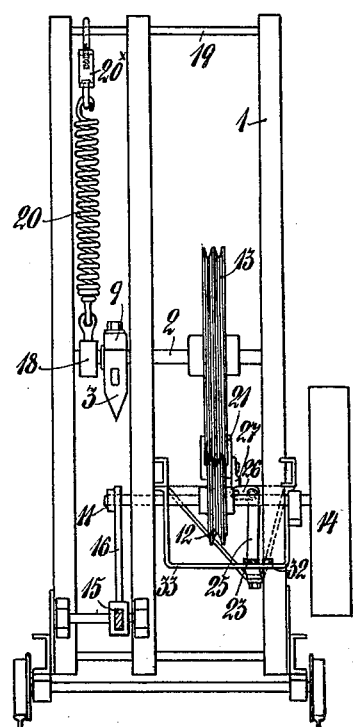
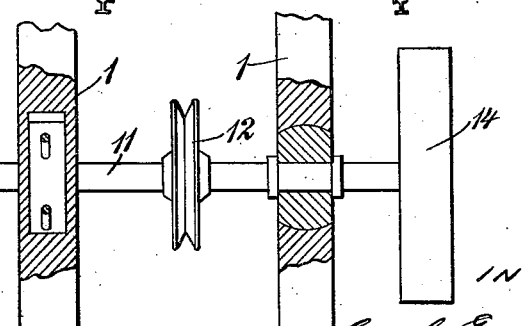

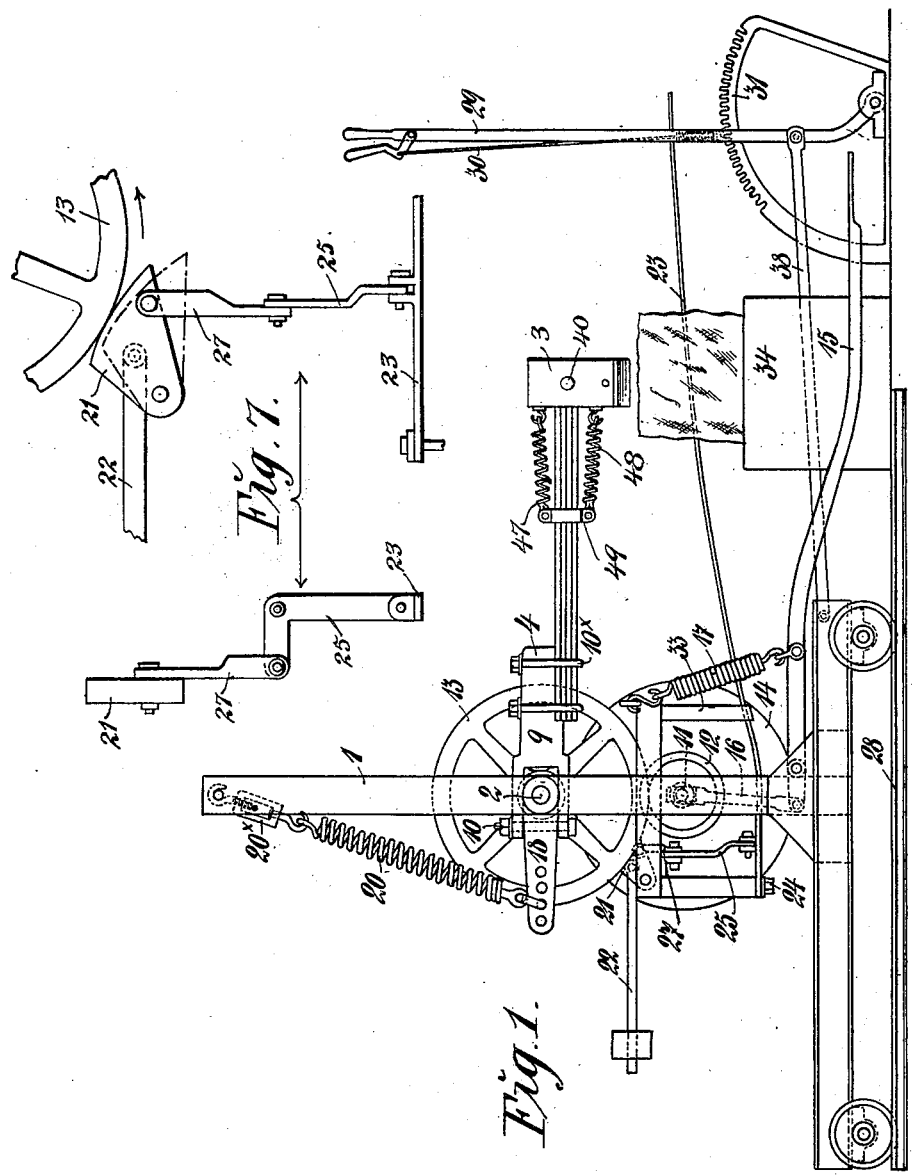

C. G. SMITH.
MACHINE FOR SPLITTING OR OTHER WORKING OF STONES AND THE LIKE.
APPLICATION FILED SEPT. 21, 1909.
999,896.
Patented Aug. 8, 1911.
3 SHEETS—SHEET 3.
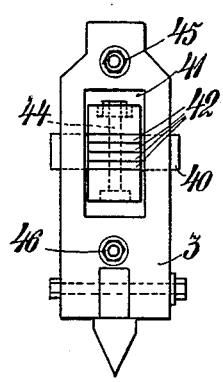
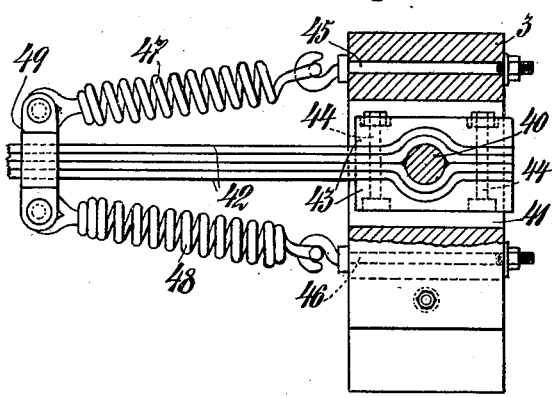
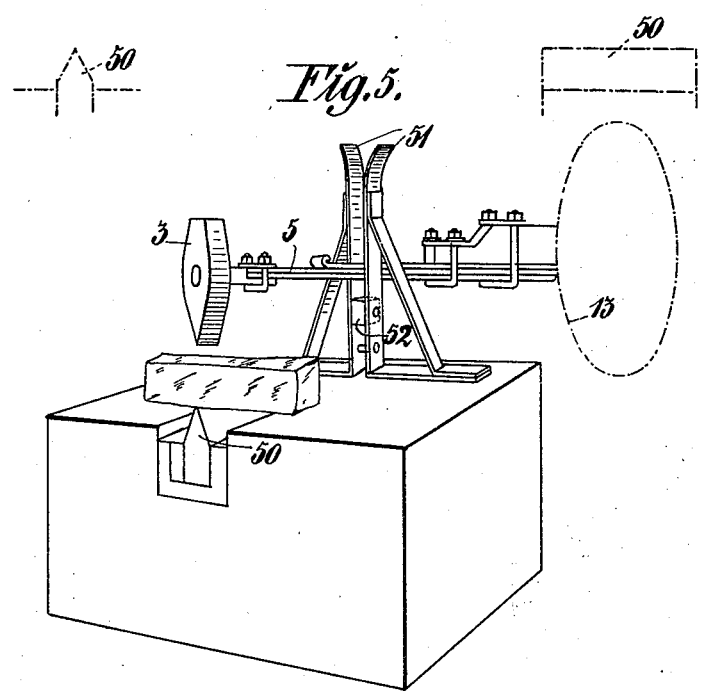

UNITED STATES PATENT OFFICE.

CARL GUSTAF SMITH, OF STOCKHOLM, SWEDEN.

MACHINE FOR SPLITTING OR OTHER WORKING OF STONES AND THE LIKE.

999,896.     Specification of Letters Patent.    Patented Aug. 8, 1911.

Application filed September 21, 1909. Serial No. 518,845.

*To all whom it may concern:*

Be it known that I, CARL GUSTAF SMITH, a subject of the King of Sweden, and resident of Karlbergsvägen 40, Stockholm, in the Kingdom of Sweden, have invented certain new and useful Improvements in Machines for the Splitting or other Working of Stones and the Like, of which the following is a specification, reference being had therein to the accompanying drawings.

This invention relates to a machine of simple construction for the splitting or other working of stones, chiefly for the manufacturing of pieces of a certain size for paving or the like.

In order to mechanically reach the best economical result in the said working, it is of importance that each piece is produced by as few blows as possible, as a great deal of time is thereby saved. During the said operation attention must be paid to the quality of the stone and to the fact that the stone will preferably be split in certain directions, great pieces extended in length or so called pillars being thereby produced, which are then easily divided into smaller pieces by making a small groove on one side, the "grooving operation," and by one or more blows, the force of which is suitably regulated, on the opposite side and opposite the said groove, so that the stone is snapped off, which operation is called the "breaking" operation. The "splitting" operation is the most difficult one, owing to the fact that generally a great piece is to be split. The said operation can however easily be effected by means of the machine in question, due to the mode of operation of the machine, according to which the splitting is effected from the top side by the edge of a heavy shank-hammer which is fixed to a rocking shaft, whose velocity in the fall is increased by one or more spiral springs fixed to the frame of the machine and an extension of the shank which latter also is elastic by being partly composed of several plate-springs one on top of the other. Owing to the said arrangement the hammer hits the stone with great force, however in such an elastic way, that neither a recoil of the hammer nor a dead blow is effected, when the edge penetrates the stone. The effect depends to a great extent on the way in which the edge of the hammer strikes the stone, so that the blow is centered, and if possible the whole length of the edge at the same time hits the stone. The said centering is easily effected by giving one or more slight blows of the hammer, while observing the manner in which it strikes the stone, and before the final blow, if necessary, correcting the position of the stone or adjusting the position of the machine, so that the edge of the hammer acts at the proper place and along its whole length, if possible. From the above statements the importance of the splitting operation being effected from the top side is readily understood; the small mark, effected by the edge during the trial-blow, being thereby observable. Without the said observation no precise splitting can be effected in a mechanical way.

A further characteristic feature of the machine in question consists in the manner in which the hammer is operated, so that the force of the blows can easily be adjusted, which is effected by a friction gear provided between the driving shaft and the shaft mentioned above, and a releasing device comprising a foot-lever, which, when pressed down, releases the sufficiently raised hammer, and, if necessary, keeps it up by a braking device. Special means are provided in the machine for keeping the hammer automatically in its raised position, releasing the hammer from the said position, adjusting the position of the hammer or the stone, so that the hammer strikes the stone at the desired point, without the stone being moved on its support, and so on, all the said arrangements being provided in order to render the work as comfortable and easy as possible, and enabling the operator to use both his hands for handling the stone.

In the accompanying drawings Figure 1 is a side view and Fig. 2 a front view of the machine. Figs. 3 to 5 inclusively show modifications.

The horizontal shaft 2 of the hammer or splitting tool is journaled in a suitable frame 1, comprising uprights and interposed pieces, the said hammer consisting of the head 3 and the shank 4 which forms a two-armed lever 9. The part of the shank nearest to the head 3 consists of several plate springs 5 located one on top of the other and connected by clamps. The head 3 of the hammer, the one end of which has a sharp edge, while the reverse end is somewhat rounded or blunt, has a short projection 6, like a handle, by means of which it is fixed to the shank 5 by a screw-bolt 7 and a clamp 8, so that the head can easily be removed in order to be reversed or replaced by a greater or smaller one, when necessary. The center part of shank 4 consists of a fork-shaped piece 9, embracing a square part of the shaft 2 and tightened by means of one or more screw bolts 10. The springs 5 are fixed to the front end of the piece 9 by means of clamps 10× or the like. Motion is transmitted to the hammer from the driving shaft 11 by a friction gear 12, 13. The shaft 11, provided with the pulley 14, is swingable vertically in such a manner, that its left end, Fig. 2 carrying the friction wheel 12, can be raised and lowered by means of the foot lever 15, to which it is connected by the link 16. The said foot lever extends forward to the place of the operator, near the support 34 for the stone, so that the operator can easily press down the foot lever and at the same time with both his hands adjust the position of the stone and manage the same. The spiral spring 17, a weight, or the like, keeps the foot lever in its raised position and the gear in its disengaged position. Between the rear part of the hammer lever, which part consists of a special arm 18 extending from the shaft 2, and the top interposed piece 19 in the frame a spiral spring 20 is provided, the tension of which is increased, as the hammer head 3 is raised. The said spring increases the force of the blow and prevents the head 3 from rebounding. The action of the spring can be increased or decreased by moving the spring outward or inward along the arm 18, provided with a plurality of holes for the hook of the spring, so that the length of the lever arm, by means of which the spring acts upon the shaft, is increased or decreased, or by increasing the number of springs, or by substituting a stronger or weaker spring for the one used and so on. The tension of the spring is adjusted by means of a screw threaded strap 20×. A brake block 21 is forced against the wheel 13 by a lever 22 acted upon by a movable weight and can be moved from the said wheel by means of a lever 23 also extending to the place of the operator, which lever is swingable horizontally on the pin 24 and acts upon an arm 25 of a bell crank lever, the other arm 26 of which is connected with the block 21 by a link 27. A projection 32 on the supporting iron loop 33 holds the lever 23 in its extreme positions. The machine is supported by wheels running on a track parallel to the shank of the hammer. A rod 38 connects the machine with a vertical lever 29, which is provided near the place of the operator and by means of which the operator can move the machine forward and backward. The said lever 29 is locked in its position by a catch 30 engaging a toothed segment 31. The support 34 for the stone, only schematically shown in Fig. 1, must be so arranged, that it has a certain slight elasticity.

As the stone, which is to be split, has been put in proper position below the head 3 of the hammer, the edge of which is turned downward, the operator presses down the foot-lever a short distance, the gear 12, 13 being then engaged instantaneously and the hammer head 3 raised. If the lever 23 has been brought into such a position, that the brake-block is out of engagement with the wheel 13, the hammer will fall down as soon as the pressure on the foot lever ceases. In this manner one or more slight blows are generally effected in order to ascertain if the edge strikes the stone correctly and to adjust the position of the stone. The foot lever is then again pressed down and the hammer head 3 is now raised to the height which may be deemed necessary. Even if a great piece of stone has to be split, it is generally sufficient to raise the hammer such a distance that the shank forms an angle of about 45° with the horizontal plane, the tension of the spring 20 being then considerably increased. Owing to the said fact a considerable velocity is imparted to the hammer, when falling down, and the hammer strikes the stone with great force without the blow injuring the machine owing to the elasticity of the shank. Moreover the said elasticity is advantageous also to the splitting or cleaving operation, owing to the fact that the head of the hammer acts more freely by its weight or has, so to say, a lashing action, compared with the action gained, if the shank was not elastic. When the hammer is raised still higher a still more powerful blow is effected.

When the stone is to be "broken", for which operation the flat end of the head is turned downward, a small groove across the piece is first effected on one of its sides, the stone being then so turned, that its side, opposite to the groove is turned upward, whereupon a slight blow is first effected and then a stronger one, breaking the stone along the groove.

The modification shown in Figs. 3 and 4 consists in the head of the hammer being connected with the shank in a movable manner and held by means of spiral springs, owing to which arrangement the straining of the shank at the blow against the stone is reduced. Fig. 3 shows the arrangement viewed longitudinally to the shank and Fig. 4 is a side view of the same. A horizontal pin 40 is thrust through the head 3 of the hammer, transversally to the same, which pin is embraced by the plate springs 42 of the shank, thrust through an opening 41 in the said head. In this case the said springs are four in number, but a greater number may be used. One half of the number is located above the pin 40 and the other half below the same. All the springs are connected in front of the pin and behind the same by means of pieces 43, held against the springs by bolts 44. The opening 41 is sufficiently great to permit the head of the hammer to swing around the pin 40 to some extent. Two screws 45 and 46 are threaded through the head of the hammer, which extend along the shank and are located one above the pin 40 and the other below the same. The said screws are connected with a ring 49 by means of spiral-springs 47 and 48 respectively, which ring is mounted around the shank, notches for the ring being provided in the sides of the springs 42 preventing the same from sliding. Instead of the said arrangement the end of the top plate spring of the shank may be bent upward, forming a support for the ring. The tension of the spiral-springs can be suitably adapted by the nuts bearing against the front side of the head, Fig. 4. If the stone has an oblique position, so that it is struck by the front or rear corner of the head, the head will be swung around the pin 40 for a small distance, counteracted by one of the springs. As stated above, the resistance of the spring can be adjusted by means of the nut. Experiments have proved that owing to the described arrangement the strongest blows do not affect in any injurious way the machine and that the splitting operation is effected very successfully. According to Figs. 3 and 4 also an edge 50 may be used as support for the stone.

The modification shown in Fig. 5 consists in a vertical guide 51 for the shank being fixed to the suitably adapted foundation of the support or the lower edge or to any other suitable part. The said guide, located at or substantially at the center of the shank, consists of two parallel bars or the like with stays, which bars are located at some distance from each other forming a passage for the shank. The top ends of the said bars are preferably bent outward as shown in Fig. 5. The said arrangement is especially suitable if the shank has a considerable length. The said parallel bars guide the shank at both its sides and thus prevent, that at a blow in oblique direction (owing to an oblique position of the stone) too great a straining on the shank is effected. Below the shank a buffer 52 is provided in the guide 51 preventing the edges 3, 50 to spoil each other if the hammer should drop down and no stone have been placed on the edge 50.

Having now described my invention, what I claim as new and desire to secure by Letters Patent is:

1. In a stone splitting machine, in combination, a frame, a hammer having a spring shank and a head portion adapted to split stones, a shaft rotatably mounted in said frame and upon which said hammer is fixed, a friction gear wheel carried by said shaft, a driven friction gear wheel adapted to be moved into and out of engagement with said first gear wheel, a brake normally engaging said first gear wheel, and means for moving said brake out of engagement with its associated gear wheel.

2. In a stone splitting machine, in combination, a frame, a hammer having a spring shank and a head portion adapted to split stones, a shaft rotatably mounted in said frame and upon which said hammer is fixed, a friction gear wheel carried by said shaft, a driven friction gear wheel adapted to be moved into and out of engagement with said first gear wheel, means normally holding said driven gear wheel out of engagement with said first gear wheel, a foot lever adapted to be actuated by the operator for moving said driven gear wheel into engagement with said first gear wheel, a brake normally engaging said first gear wheel, and means for moving said brake out of engagement with its associated gear wheel.

3. In a stone splitting machine, in combination, a frame, a hammer having a spring shank and a head portion adapted to split stones, a shaft rotatably mounted in said frame and upon which said hammer is fixed, a friction gear wheel carried by said shaft, a driven friction gear wheel adapted to be moved into and out of engagement with said first gear wheel, a brake, means normally holding said brake in engagement with said first gear wheel, a lever operatively connected to said brake and adapted to be actuated by the operator to throw the brake out of engagement with said associated gear wheel.

4. In a stone splitting machine, in combination, a frame, a hammer having a spring shank and a head portion adapted to split stones, said head portion being pivotally supported upon said shank whereby it will adjust itself to the stone, a shaft rotatably mounted in said frame and upon which said hammer is fixed, a friction gear wheel carried by said shaft, a driven friction gear wheel adapted to be moved into and out of engagement with said first gear wheel, a brake normally engaging said first gear wheel, and means for moving said brake out of engagement with its associated gear wheel.

5. In a stone splitting machine, in combination, a frame, a hammer having a spring shank and a head portion adapted to split stones, said head portion being pivotally supported upon said shank whereby it will adjust itself to the stone, yielding means for holding said head in its normal position, a shaft rotatably mounted in said frame and upon which said hammer is fixed, a friction gear wheel carried by said shaft, a driven friction gear wheel adapted to be moved into and out of engagement with said first gear wheel, a brake normally engaging said first gear, and means for moving said brake out of engagement with its associated gear wheel.

6. In a stone-splitting machine, in combination, a frame, a hammer shank pivotally supported thereon, said shank comprising an elastic portion, a hammer head pivotally mounted upon said shank, springs connected to said shank and to said head, the points of connection of the springs with the head lying on opposite sides of the pivotal point of connection of the head with the shank and means for actuating said hammer.

In witness whereof, I have hereunto signed my name in the presence of two subscribing witnesses.

CARL GUSTAF SMITH.

Witnesses:
 TORVALD NYSTRÖM,
 ROBERT APELGREN.

Copies of this patent may be obtained for five cents each, by addressing the "Commissioner of Patents, Washington, D. C."